US008717088B2

(12) United States Patent
Vereb et al.

(10) Patent No.: US 8,717,088 B2
(45) Date of Patent: May 6, 2014

(54) DEVICE AND METHOD FOR PROVIDING POWER TO A MICROCONTROLLER

(75) Inventors: Ferenc Vereb, Keswick (CA); Marek Pach, Toronto (CA)

(73) Assignee: Lotek Wireless Inc., Newmarket, Ontario (CA)

( * ) Notice: Subject to any disclaimer, the term of this patent is extended or adjusted under 35 U.S.C. 154(b) by 27 days.

(21) Appl. No.: 13/814,133

(22) PCT Filed: Aug. 17, 2011

(86) PCT No.: PCT/CA2011/000966
§ 371 (c)(1),
(2), (4) Date: Feb. 4, 2013

(87) PCT Pub. No.: WO2012/021986
PCT Pub. Date: Feb. 23, 2012

(65) Prior Publication Data
US 2013/0127523 A1 May 23, 2013

(30) Foreign Application Priority Data

Aug. 18, 2010 (CA) ..................................... 2713473

(51) Int. Cl.
*G05F 1/10* (2006.01)
*G05F 3/02* (2006.01)
(52) U.S. Cl.
USPC ......................................................... 327/536
(58) Field of Classification Search
USPC ....................................... 327/536; 363/59–60
See application file for complete search history.

(56) References Cited

U.S. PATENT DOCUMENTS

| | | | |
|---|---|---|---|
| 5,422,826 A * | 6/1995 | Cousineau | 700/287 |
| 6,859,091 B1 * | 2/2005 | Nicholson et al. | 327/536 |
| 7,605,579 B2 | 10/2009 | Betser et al. | |
| 2008/0126864 A1 * | 5/2008 | Abdul et al. | 714/31 |
| 2008/0143424 A1 * | 6/2008 | Tain | 327/536 |
| 2008/0150619 A1 | 6/2008 | Lesso et al. | |
| 2008/0272833 A1 | 11/2008 | Ivanov et al. | |
| 2009/0039947 A1 | 2/2009 | Williams | |

OTHER PUBLICATIONS

Deschamps et al., "A Flying-Capacitor ZVS PWM 1.5kW DC-to-DC Converter with Half of the Input Voltage Across the Switches," IEEE Transactions on Power Electronics, vol. 15, No. 5, pp. 855-860, Sep. 2000.

* cited by examiner

*Primary Examiner* — Quan Tra
(74) *Attorney, Agent, or Firm* — Kagan Binder, PLLC

(57) ABSTRACT

A charge pump device and method for providing power to a microcontroller where the voltage required to operate the microcontroller (VCCmin) is greater than the voltage of the power source, which may be a single galvanic cell. The invention utilizes a flying capacitor circuit having a flying capacitor, and a supply capacitor connected to the power supply terminal of the microcontroller. The invention utilizes firmware that runs on the microcontroller and which controls the flying capacitor circuit to repeatedly switch the flying capacitor from being connected in series with the power source to being connected in parallel with the power source so as to maintain the voltage provided to the microcontroller at a level of at least VCCmin.

19 Claims, 6 Drawing Sheets

DEVICE AND METHOD FOR PROVIDING POWER TO A MICROCONTROLLER

RELATED APPLICATION

This application claims the benefit from International Application No. PCT/CA2011/000966, filed Aug. 17, 2011, which in turn claims priority from Canadian Application having serial number 2,713,473, filed on Aug. 18, 2010, both of which are incorporated herein by reference in their entireties.

FIELD OF THE INVENTION

The present invention relates generally to devices for and methods of providing power to a microcontroller, and more particularly to devices for and methods of providing power to a microcontroller using a low voltage power source.

BACKGROUND OF THE INVENTION

Microcontrollers, or microcontroller units (MCUs), are integrated circuits that are generally embedded in devices or products to control aspects of the device or product or monitor external events according to the software (firmware) running on the MCU. There is generally a desire to minimize the size of such devices, which has led to the miniaturization of MCUs.

However, an MCU requires a power source. This is typically provided by electrochemical cells, which may be galvanic cell batteries, such as alkaline, silver oxide, zinc-carbon and nickel cadmium cells. Each cell generally provides a maximum of about 1.2 to 1.5 volts. MCUs typically require up to 5 volts, which is generally provided by multiple cells. The desire to reduce size has led to the availability of ultra low power MCU families that utilize CMOS semiconductor technology. However, even these MCUs require at least 1.8 volts currently, and so require at least two cells connected in series, in the absence of voltage boosting circuitry. Also, it may be advantageous to use MCUs that require higher voltages for cost or other reasons.

One approach to allowing an MCU to operate with a single cell that has sufficient energy to power the MCU is to employ a voltage boosting circuit, also referred to as a DC-to-DC converter or a step-up voltage converter. Such converters generally fall into one of two categories: (1) those that switch the current flow through an inductor, and (2) those which that switch the current flow through a capacitor. The latter is often referred to as a "charge pump". Many variants of these types of converters are known.

The use of a separate step-up voltage converter at least partially defeats the purpose of using the converter by increasing the size of the device as well as its cost and complexity.

Approaches have been disclosed where some elements of an inductor-based step-up converter are incorporated into an MCU chip. However they require an external inductor to operate, which increases the size of the device significantly. Such a solution also precludes ultra low power operation due to the current consumption of the boost circuit.

SUMMARY OF THE INVENTION

The invention provides a charge pump device for connecting a direct current power source to a microcontroller, which microcontroller operates with an input voltage level of at least VCCmin, where VCCmin is greater than the voltage across the power source, the charge pump comprising:

a. a supply capacitor connected to the power supply terminal of the microcontroller;
b. a flying capacitor circuit having a flying capacitor, the flying capacitor circuit being switchably connected to the power supply terminal of the microcontroller and to the power source; and
c. firmware for execution by the microcontroller to control the flying capacitor circuit to repeatedly switch the flying capacitor between being connected in series with the power source and being connected in parallel with the power source to top up the charge on the supply capacitor so that the voltage supplied to the microcontroller is maintained at a level of at least VCCmin, wherein the power source is connected either to the power supply terminal of the microcontroller or a ground.

The invention also provides a method of operating a microcontroller, which operates with an input voltage level of at least VCCmin, using a direct current power source, the power source having an output voltage of less than VCCmin, the method comprising the steps of:

a. connecting a flying capacitor circuit having a flying capacitor to the microcontroller and the power source;
b. programming the microcontroller with firmware to repeatedly switch the flying capacitor between being connected in series with the power source and being connected in parallel with the power source;
c. connecting a supply capacitor to the power supply terminal of the microcontroller to supply a voltage to the microcontroller; and
d. charging the supply capacitor using an external power source so that the voltage supplied to the microcontroller is at least VCCmin and the microcontroller begins to execute the firmware, wherein the switching of the flying capacitor is controlled by the firmware so as to maintain the voltage supplied to the microcontroller at a level of at least VCCmin.

The switching of the flying capacitor may be performed in a pattern that is pre-determined to be sufficient to maintain the voltage supplied to the microcontroller at a level of at least VCCmin. The pre-determined switching pattern may be selected to maintain the voltage supplied to the microcontroller at a voltage in a pre-defined sub-range between a lower level that is greater than VCCmin and an upper level that is less than two times the voltage across the power source.

The supply capacitor may be initially charged by an external power source to supply a voltage of at least VCCmin to the microprocessor.

The microcontroller may monitor the voltage being provided to the microcontroller and switch the voltage through the flying capacitor as required to maintain the voltage being supplied to the microcontroller at a level of at least VCCmin.

The flying capacitor circuit may include two transistors, one being a high-side switching transistor and the other being a low-side switching transistor. The transistors may be either P-channel or N-channel transistors or a mixture thereof. The high-side switching transistor may be an N-channel transistor or a P-channel transistor. The low-side switching transistor may be an N-channel transistor a P-channel transistor. The two transistors of the flying capacitor circuit may be integrated on a chip with the microcontroller.

The power source may comprise at least one galvanic cell and may employ only a single galvanic cell. The voltage across the power source may be less than 1.6 volts. VCCmin may be at least 1.8 volts or may be at least 3.0 volts.

BRIEF DESCRIPTION OF THE DRAWINGS

The present invention will now be described by way of example with reference to the following drawings.

DETAILED DESCRIPTION OF THE INVENTION

The invention is a charge pump device for providing power to an MCU using a low-voltage power source, such as a single galvanic cell, and methods for providing such power.

Figure 1:
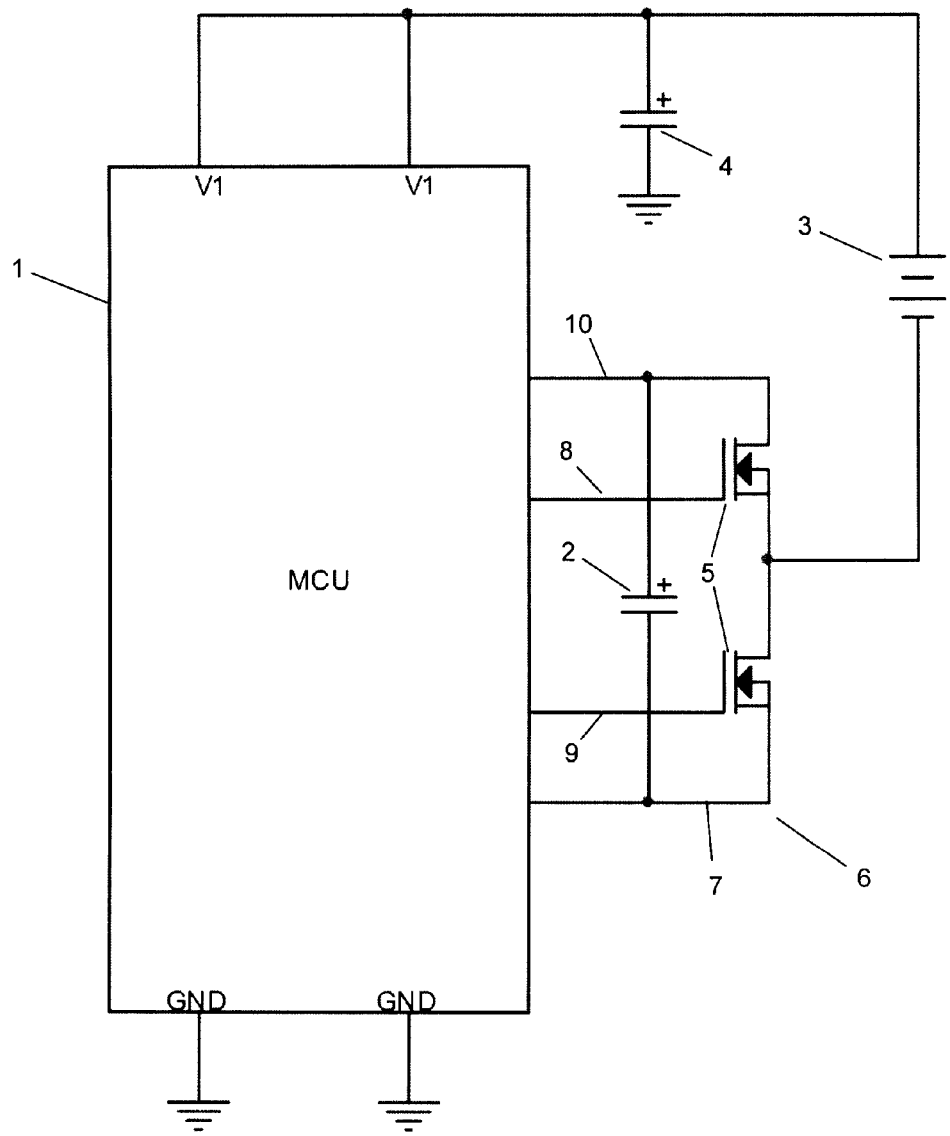
FIG. 1 is a schematic diagram of an embodiment of the invention.

FIG. 1 shows a schematic diagram of the invention with an MCU 1 and power source 3. The charge pump includes a flying capacitor circuit 6 and a supply capacitor 4. The flying capacitor circuit 6 includes a flying capacitor 2 that may be connected to the power source 3 either in series or in parallel. The flying capacitor circuit 6 is connected to the MCU 1 so that the MCU 1 can control switching of the connection of the flying capacitor 2 and the power source 3 between a series and parallel connection. In the embodiment shown in FIG. 1, the switching is facilitated by two P-type or N-type MOSFET transistors 5 along with the CMOS transistors inherently present in the general-purpose I/O lines of the MCU 1.

The MCU 1 may be a standard MCU that requires an input direct current (DC) voltage at some minimum level, which we refer to as VCCmin. For example VCCmin may vary between 1.8 and 5 volts for different MCUs. The MCU 1 may have non-volatile memory for storage of firmware which is executed when the MCU 1 is powered up and which controls the operation of the MCU 1.

The supply capacitor 4 is permanently connected to the supply terminals of the MCU 1 as shown in FIG. 1. In this application, "connected" means electrically connected, and not simply a direct mechanical connection. The supply capacitor 4 is initially charged by an external source to supply a voltage level to the MCU 1 within the specified operating range of the MCU 1. The external source may be, for example, an external programming device, such as a JTAG programmer. The JTAG programmer attaches to the MCU 1 via pins that are dedicated for firmware programming on the MCU 1. These pins include the same supply terminals of the MCU 1. The supply capacitor 4 is charged up by the JTAG programmer while it remains connected to the MCU 1. The voltage level on the supply capacitor 4 is defined by the output voltage of the JTAG programmer, which is set to be at least VCCmin. The voltage provided to the MCU 1 during the firmware upload is thus sufficient for the MCU to operate. After the firmware upload has been completed, the MCU 1 begins to execute the firmware, maintaining the voltage on the supply capacitor 4 as described herein, and the programming device can be safely disconnected from the MCU.

The supply capacitor may be selected to have a sufficiently high capacitance to hold a voltage of at least VCCmin between two active states when the microcontroller is in an inactive state and not maintaining VCC actively. The value of the capacitance C required to maintain the supply voltage above VCCmin depends on four known factors: 1) the average current consumption of the MCU 1 over the period of time under consideration $I_{avg}$; 2) the leakage current of the capacitor $I_{leak}$; 3) the length of the period (the time $\Delta t$); and 4) the amount of voltage drop $\Delta U$ that can be safely afforded (which depends on the starting voltage point VCC1). It is necessary that VCC1−$\Delta U$>VCCmin. The required value of the capacitance C equals $[(I_{avg}+I_{leak})\cdot \Delta t]/\Delta U$.

Figure 2:
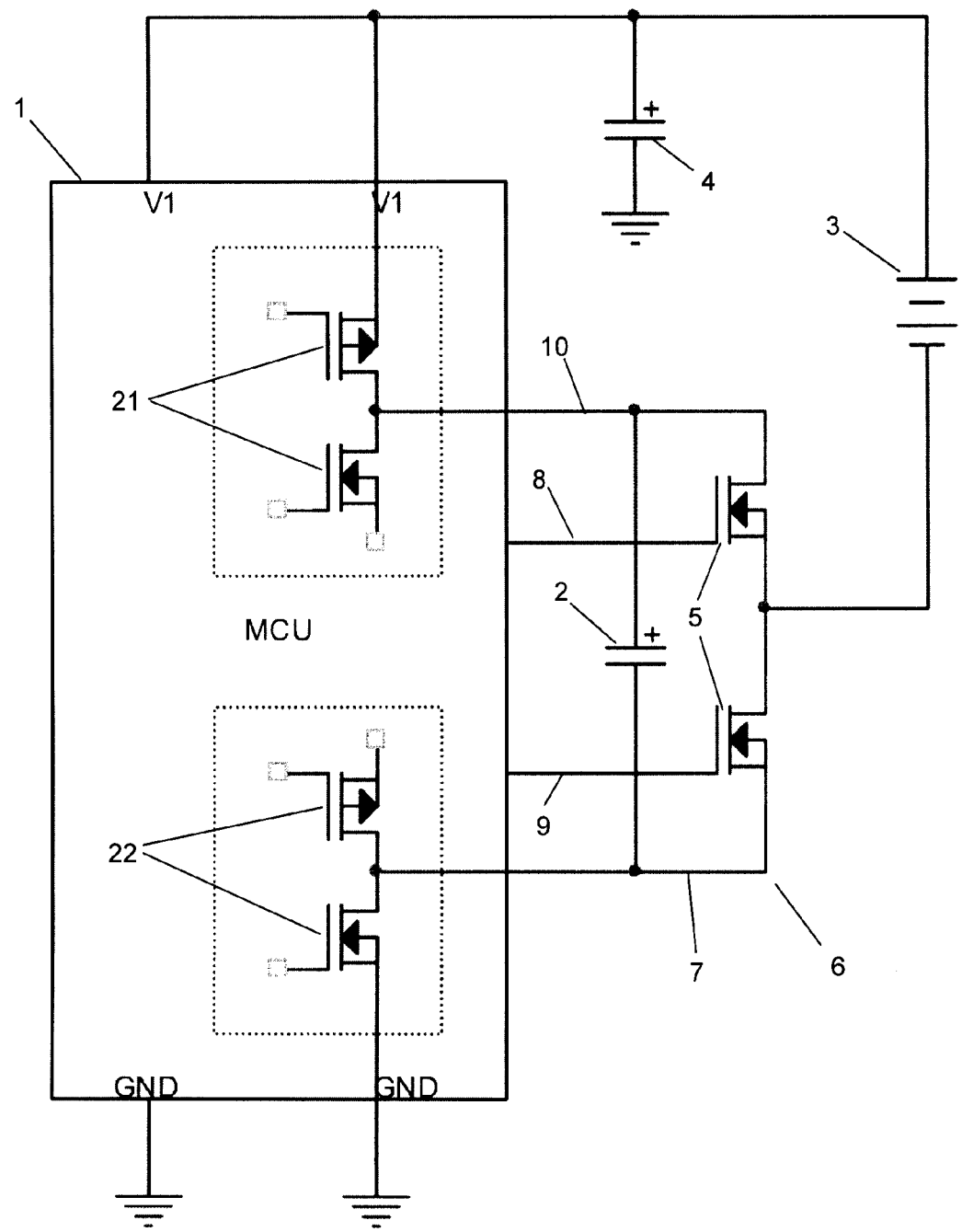
FIG. 2 is a schematic diagram of an embodiment of the invention showing internal components of the microcontroller.
Figure 3:
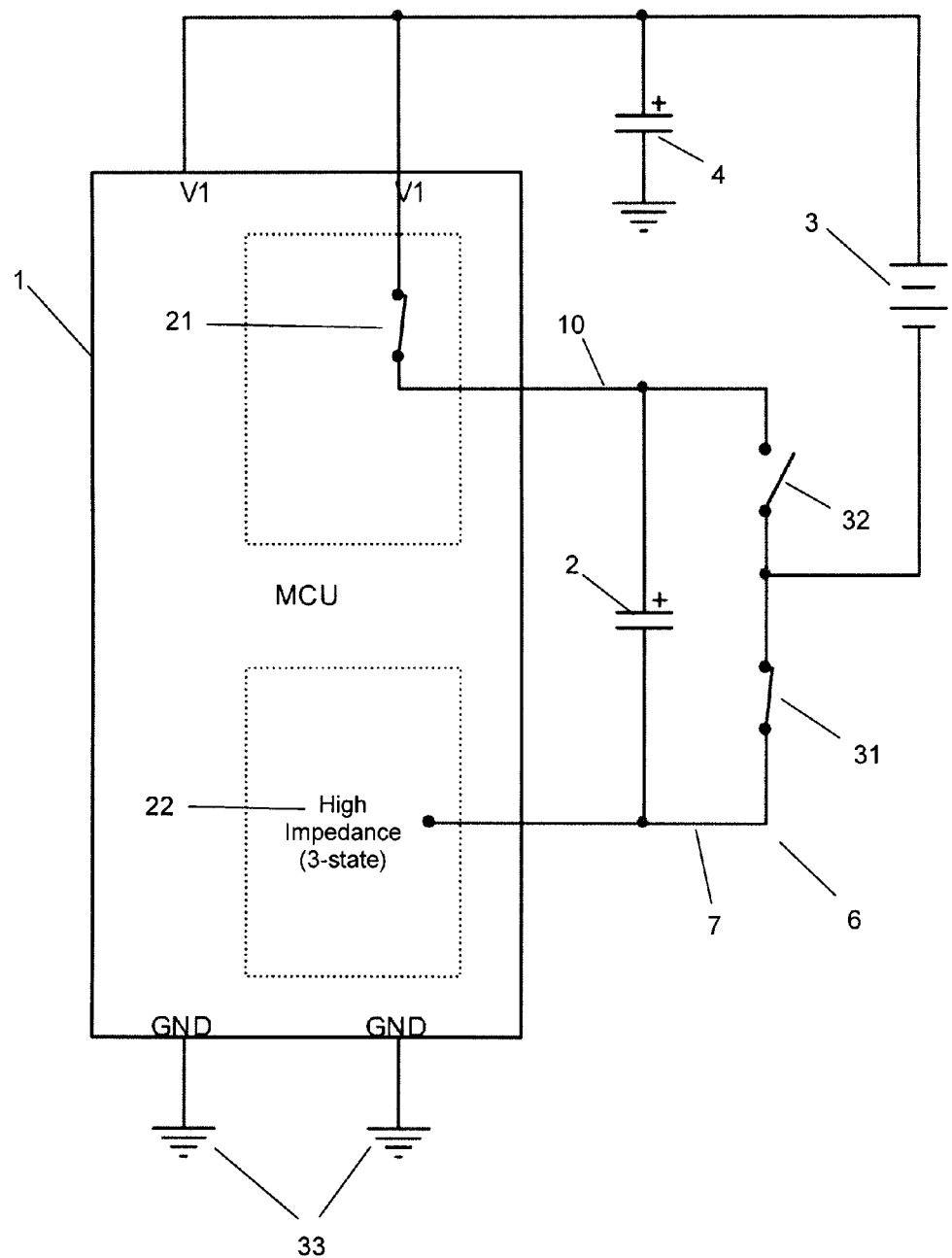
FIG. 3 is a schematic diagram of an embodiment of the invention showing the flying capacitor circuit connected in parallel with the power source.
Figure 4:
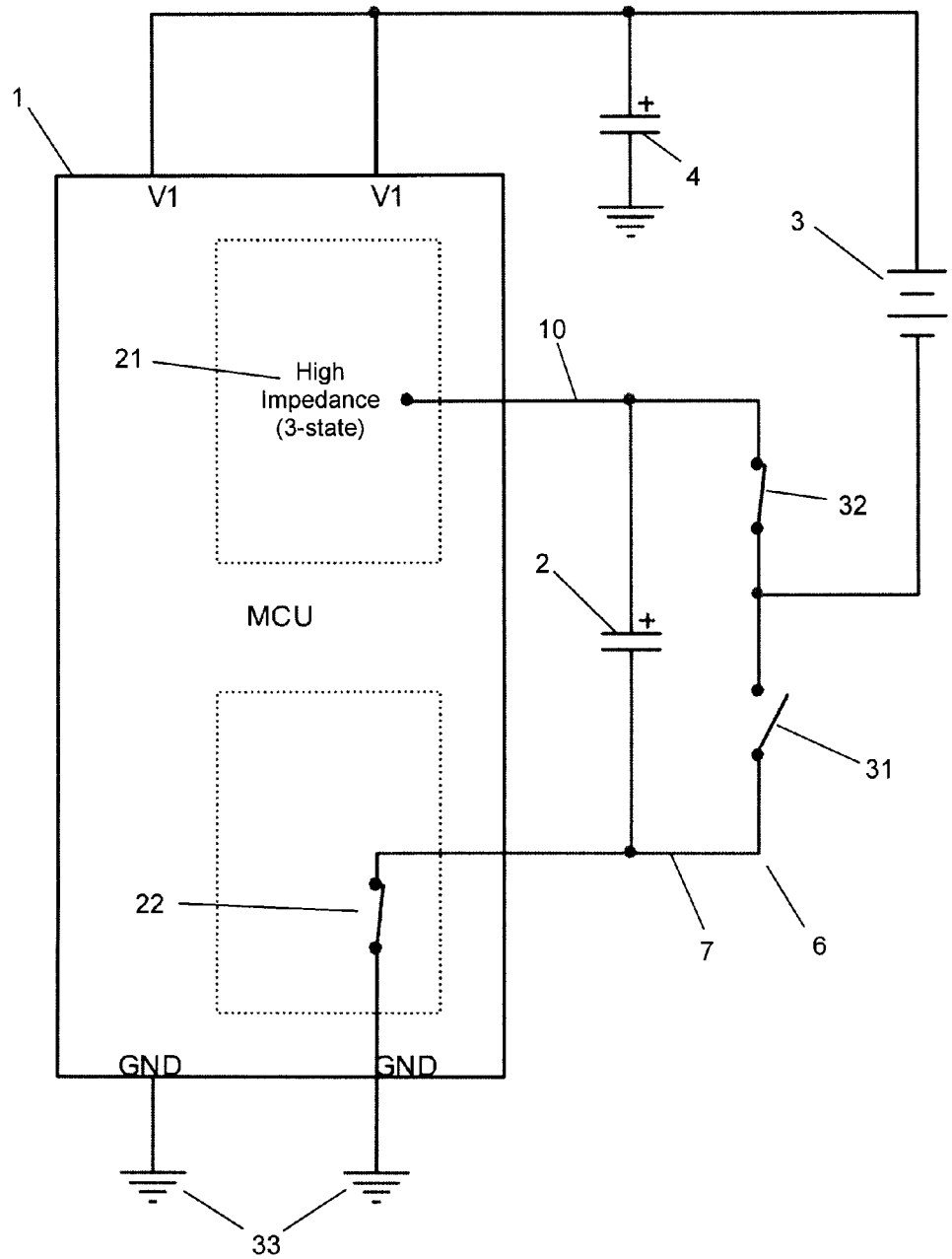
FIG. 4 is a schematic diagram of an embodiment of the invention showing the flying capacitor circuit connected in series with the power source.

The flying capacitor circuit 6 may include two transistors 5 external to the MCU 1 that are connected to the terminals of the flying capacitor 2 via the MCU 1 general-purpose I/O lines. The transistors 5 are configured in a way that allows switching the effective arrangement of connections between the flying capacitor 2 and the power source 3. FIG. 2 illustrates the connections with the internal transistors 21 and 22 which are inherently present in the MCU as part of its general-purpose I/O lines' electronic structure, and which are employed as part of the flying capacitor circuit 6. The transistors can be switched on or off as may be required to connect the flying capacitor 2 parallel to the power source 3 as shown in FIG. 3, by connecting the negative terminal of the flying capacitor 7 through one external transistor 31 to the power source 3 and disconnecting it from the ground 33 via internal MCU transistors 22, and disconnecting the positive terminal of the flying capacitor 10 from the power source 3 via the other external transistor 32 and connecting it to the MCU power supply terminal via internal transistors 21. The flying capacitor 2 can be connected in series with the power source 3 as shown in FIG. 4, by connecting the positive terminal of the flying capacitor 10 to the power source 3 through one transistor 32 and disconnecting it from the MCU power supply terminal via internal MCU transistors 21, and disconnecting the negative terminal of the flying capacitor 7 from the power source 3 through the other transistor 31 and connecting it to the ground via internal transistors 22.

Although the high-side switching transistor that has one of its conducting channel contacts (either the drain or the source) connected to VCC (the high potential point of the circuit) would typically be a P-channel transistor with its source connected to VCC, it could alternatively be an N-channel transistor. Similarly, although the low-side switching transistor, which has one of its conducting channel contacts (either the drain or the source) connected to VSS (the low potential point of the circuit), would typically be an N-channel transistor, it could alternatively be a P-channel transistor.

The firmware that is downloaded to the MCU 1 includes code to control the flying capacitor circuit 6 to switch the connection between the flying capacitor 2 and the power source 3 between series and parallel. Initially the flying capacitor 2 is uncharged and the connection established by the firmware is in parallel in order to charge the flying capacitor 2. During this phase, the supply capacitor 4 provides the required current to the MCU 1 at a voltage of at least VCCmin. The flying capacitor circuit 6 is then switched to a series connection in which the flying capacitor 2 together with the power source 3 boosts the voltage across the supply capacitor 2. During this phase the charge stored in the flying capacitor 2 is partially transferred to the supply capacitor 4, topping up its charge and boosting its voltage. As the charge in the flying capacitor 2 drops and the voltage provided to the MCU 1, referred to as "VCC", approaches VCCmin, the flying capacitor circuit 6 is switched back to a parallel configuration to top up the charge of the flying capacitor 2. This process is repeated as required to maintain the voltage level, VCC, provided to the MCU 1 at a level of at least VCCmin.

The switching frequency may be fixed so that the flying capacitor 2 becomes charged to approximately the voltage of the power source 3. In that case VCC will be about double the voltage of the power source 3. In the simplest mode, the supply capacitor 4 may be periodically topped up above VCCmin by applying an appropriate number of switching cycles when the voltage drops close to VCCmin. The frequency of topping up the supply capacitor 4 charge may be reduced by topping the supply capacitor 4 up periodically so that VCC is about double the voltage of the power supply 3. Conversely, if VCC is maintained close to VCCmin, then the topping up will need to be done relatively frequently. In general it is most efficient to reduce the amount of switching required so as to reduce power loss that is inherent in the switching process.

The frequency of topping up the supply capacitor 4 may be made to be very low depending on the power demands of the MCU 1. When the MCU 1 is in sleep mode, or inactive, the flying capacitor circuit may be disconnected and no switching performed while VCC remains above VCCmin. As described above, the time interval between the top-ups is a function of the capacitance of the supply capacitor, the total of the sleep and leakage current, and the permissible voltage drop. All of these values are known so that a safe time interval between top-ups can be pre-determined and the operation of the MCU firmware programmed accordingly.

The firmware may be designed so that only the charge required to top up the flying capacitor 2 a certain amount above VCCmin is transferred to the supply capacitor 4 so that VCC is always maintained close to VCCmin. It may be sufficient to pre-determine a fixed switching pattern consisting of an adequate number of switching cycles per top-up and a topping up frequency instead of dynamically determining a switching pattern for maintaining the supply voltage at a level of at least VCCmin. The calculated fixed switching pattern is designed to ensure that the supply capacitor 4 is always maintained at a level of at least VCCmin. Employing a predetermined switching pattern can reduce current consumption and switching losses compared to variable frequency modes of operation.

Alternatively, the input voltage VCC may be monitored by the MCU's analog to digital converter (ADC). Then the switching pattern may be dynamically adjusted by the MCU 1 in order to keep VCC close to the minimum level of VCCmin to keep the supply current consumption of the entire circuit at a minimum. The voltage level measured by the ADC may be used as feedback to the firmware for maintaining VCC near the minimum level of VCCmin. Keeping VCC at or slightly above the minimum level of VCCmin ensures the longest battery life since it results in the smallest achievable current consumption possible for ultra-low power systems.

If desired, VCC may be maintained within a particular sub-range of the operating range of a low voltage of VCCmin to a high voltage of double the voltage of the power source 3 between a lower level that is greater than or equal to VCCmin and an upper level of less than or equal to two times the voltage across the power source. For example, if VCCmin is 2.0 volts and the voltage across the power supply is 1.5 volts, the sub-range may be chosen to be from 2.1 to 2.4 volts, or from 2.2 to 2.6 volts. The I/O levels may thereby be operated within a desired voltage range. Such a voltage level range may be achieved by providing feedback to the firmware through sampling, or measuring, of the voltage VCC by the ADC. The firmware then may control the flying capacitor circuit 6 to generate a voltage within the desired range.

The flying capacitor 2 in the flying capacitor circuit 6 may be selected to have capacitance to provide a voltage rating of the difference between VCCmin, or slightly higher, and the power source voltage, which allows the use of low cost and smaller parts, thus reducing size, weight and cost of the circuit.

The flying capacitor 2 in the flying capacitor circuit 6 may have a small capacitance value suitable for low power operation using a predetermined fixed or variable switching pattern. The amount of charge that the capacitor can hold at any given voltage is directly proportional to its capacitance. A capacitor of small capacitance will hold less charge than one of large capacitance; it will thus also transfer a smaller charge during each switching cycle, resulting in a smaller voltage increase for the supply capacitor 4. As the capacitance of the flying capacitor 2 becomes smaller, more switching cycles are required to provide the same voltage increase. This can be done, for example, through bursts of more switching cycles, or through more frequent bursts of the same number of cycles, or through more frequent switching at a higher uniform frequency. The flying capacitor's capacitance cannot be arbitrarily small, since at some point switching at the maximum possible frequency would be insufficient to keep the supply voltage from dropping. The benefit of smaller flying capacitor capacitance value is the resulting smaller size of the flying capacitor 2, which may be important in some designs. The penalty for frequent switching is the increase in the inevitable switching loss resulting in reduced system efficiency.

The flying capacitor 2 in the flying capacitor circuit 6 may have a large capacitance rating suitable for ultra-low power operation by maintaining the VCC above VCCmin. Larger capacitance of the flying capacitor 2 will allow in a smaller total number of switching cycles to replenish the charge on the supply capacitor 4.

The system efficiency will improve because of smaller switching losses and thus the total power consumption of the system will also be smaller. The penalty for better switching efficiency is the increased size, and possibly cost, of the flying capacitor 2.

The charge current from the power source 3 that charges the flying capacitor 2 is limited by the on-resistance of the transistors residing in the standard GPIO pad modules integrated in the MCU 1. The standard GPIO pins integrated in the MCU 1 may be combined together to reduce the on-resistance of the transistors residing in the standard GPIO pad modules integrated in the microcontroller. The transistors in the I/O lines, which act as switches, have some resistance (greater than zero Ohms) due to the limitations of the fabrication process. The resistance of the switch limits the maximum current which can be sourced or sinked through the corresponding line. An embedded MCU design may often have some I/O lines which remain unused. Such unused lines may be utilized to further improve the operation of the charge pump. Combining two I/O lines by connecting them in parallel can reduce the resulting line resistance by factor of two, thus doubling the combined available current. This allows for faster charge transfer, halving the time which would otherwise be required.

In an alternate embodiment, the power source 3 may be connected between the flying capacitor circuit 6 and the ground 33. Such an embodiment is shown in FIGS. 5 and 6 which show the flying capacitor circuit connected, respectively, in parallel and in series with the power source 3.

Figure 5:
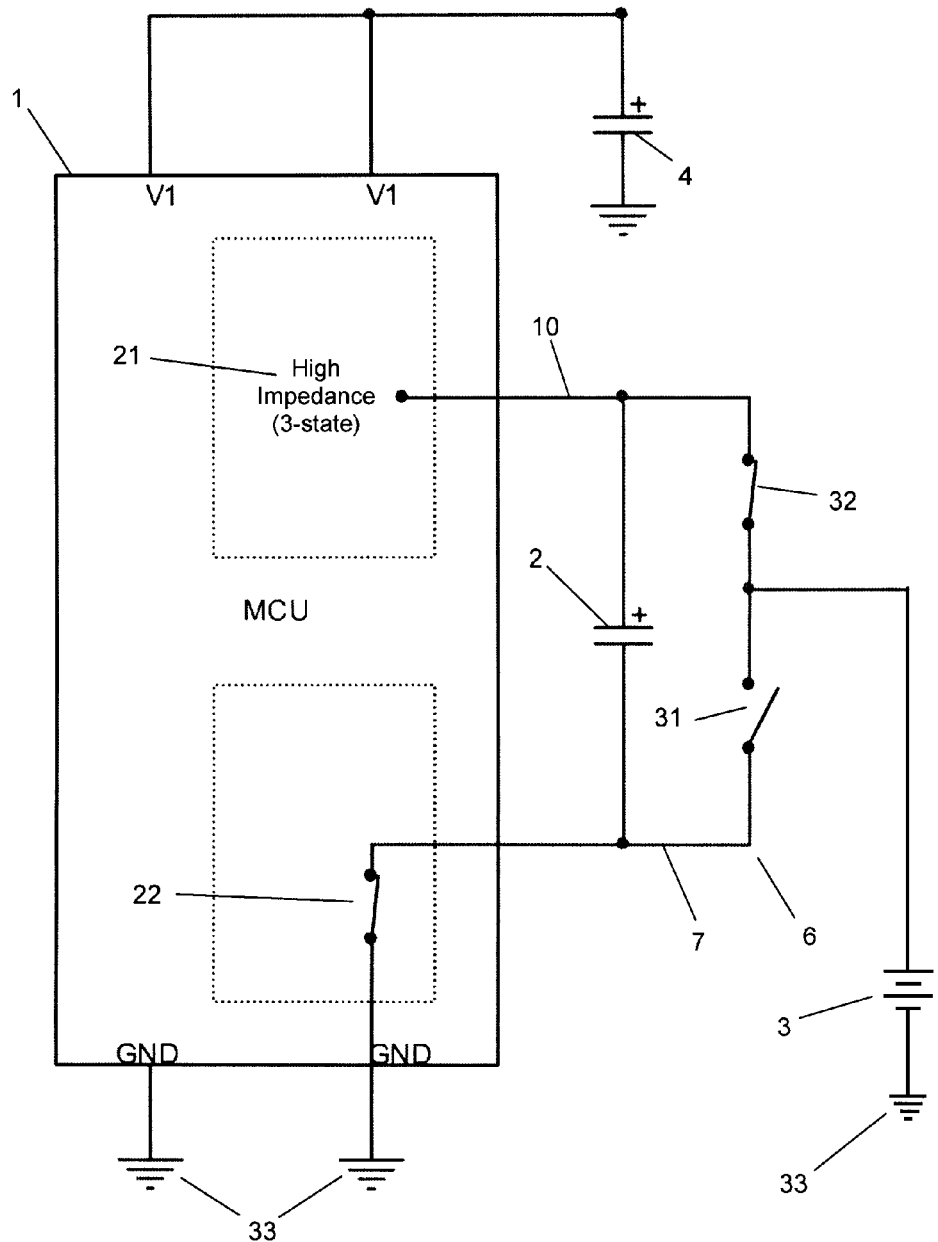
FIG. 5 is a schematic diagram of an alternate embodiment of the invention showing the flying capacitor circuit connected in parallel with the power source.
Figure 6:
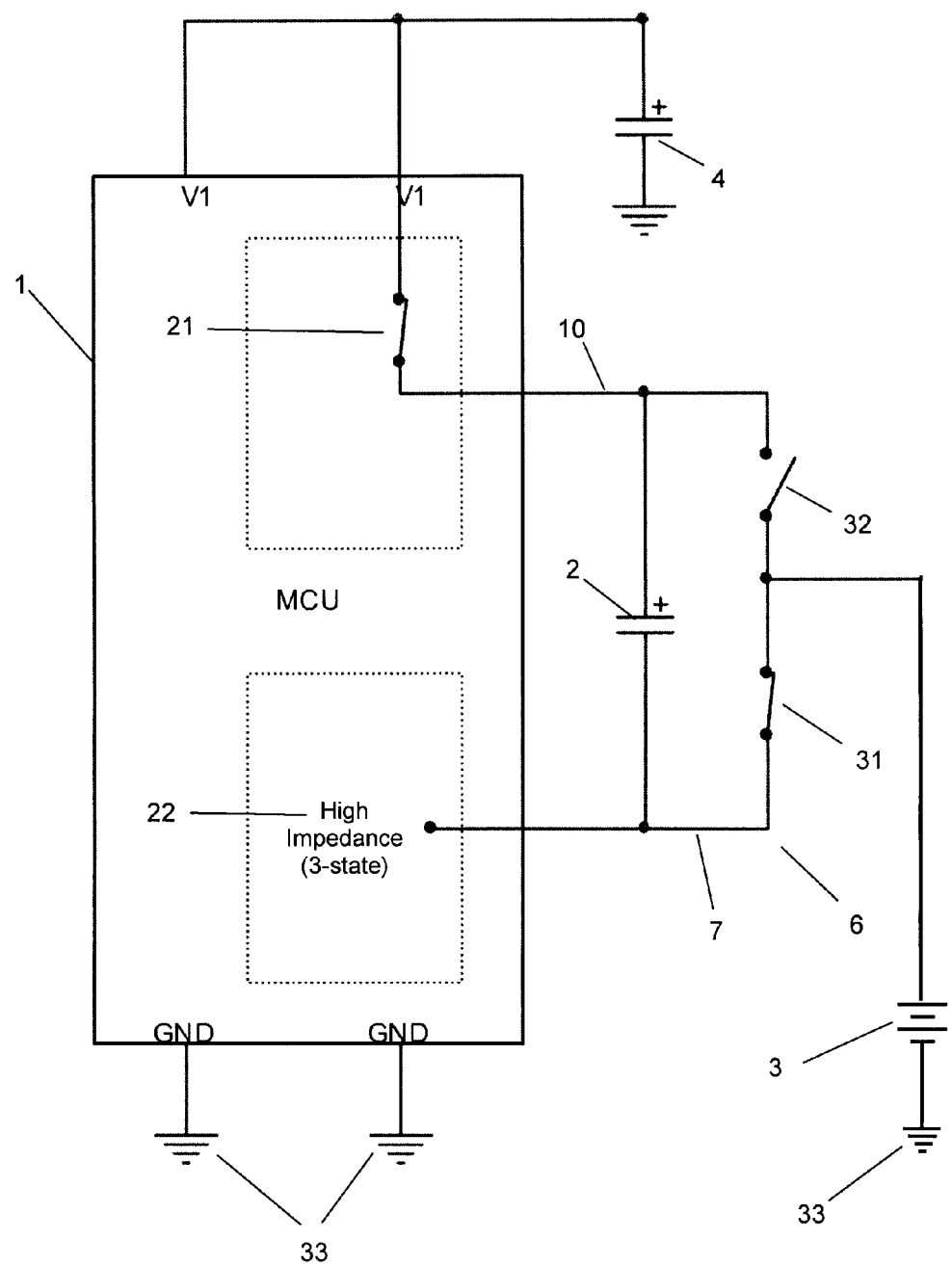
FIG. 6 is a schematic diagram of an alternate embodiment of the invention showing the flying capacitor circuit connected in series with the power source.

The external transistors 5 can be switched on or off as required to connect the flying capacitor 2 parallel to the power source 3 as shown in FIG. 5, by connecting the positive terminal of the flying capacitor 10 through one external transistor 32 to the power source 3 and disconnecting it from the MCU power supply terminal via internal MCU transistors 21, and disconnecting the negative terminal of the flying capacitor 7 from the power source 3 via the other external transistor 31 and connecting it to the ground 33 via internal transistors 22. The flying capacitor 2 can be connected in series with the power source 3 as shown in FIG. 6, by connecting the negative terminal of the flying capacitor 7 to the power source 3 through one transistor 31 and disconnecting it from the ground 33 via internal MCU transistors 22, and disconnecting the positive terminal of the flying capacitor 10 from the power source 3 through the other transistor 32 and connecting it to the MCU power supply terminal via internal transistors 21.

The only external components of the flying capacitor circuit 6, other than the flying capacitor 2, which in the example shown in FIG. 1 are the two external transistors 5, may optionally be integrated on the same chip as the MCU 1. While increasing the cost slightly, this would result in the minimum use of space. MCU implementations almost always use at least one main supply capacitor parallel to the supply terminals whether or not a charge pump is used. Thus if the transistors 5 are on the chip with the MCU, the only required additional component as compared to an unboosted implementation would be the flying capacitor 2.

It will be appreciated that the above description relates to the described embodiments by way of example only. Many variations on the system and method for delivering the invention without departing from the spirit of same will be clear to those knowledgeable in the field, and such variations are within the scope of the invention as described and claimed, whether or not expressly described.

What is claimed is:

1. A charge pump for connecting a direct current power source to a programmable microcontroller, which programmable microcontroller operates with an input voltage level of at least VCCmin, where VCCmin is greater than the voltage across the power source, the charge pump comprising:
   a. a supply capacitor connected to the power supply terminal of the microcontroller;
   b. a flying capacitor circuit having a flying capacitor, the flying capacitor circuit being switchably connected to the power supply terminal of the microcontroller and to the power source; and
   c. firmware for execution by the programmable microcontroller to control the flying capacitor circuit to repeatedly switch the flying capacitor between being connected in series with the power source and being connected in parallel with the power source, so that the voltage supplied to the programmable microcontroller through the supply capacitor is maintained at a level of at least VCCmin,
   wherein the supply capacitor is initially charged to supply a voltage of at least VCCmin to the programmable microcontroller,
   and wherein the initial charge is provided by an external power source that is disconnected from the charge pump after the initial charging has been completed.

2. The charge pump of claim 1 wherein the switching of the flying capacitor is performed in a pattern that is pre-determined to be sufficient to maintain the voltage supplied to the microcontroller at a level of at least VCCmin.

3. The charge pump of claim 2 wherein the pre-determined pattern is selected to maintain the voltage supplied to the microcontroller at a voltage in a pre-defined sub-range between a lower level that is greater than VCCmin and an upper level that is less than two times the voltage across the power source.

4. The charge pump of claim 1 wherein the microcontroller monitors the voltage being provided to the microcontroller and switches the voltage through the flying capacitor as required to maintain the voltage being supplied to the microcontroller at a level of at least VCCmin.

5. The charge pump of claim 1 wherein the flying capacitor circuit further comprises two transistors, one being a high-side switching transistor and the other being a low-side switching transistor.

6. The charge pump of claim 5 wherein the transistors are either P-channel or N-channel transistors or a mixture thereof.

7. The charge pump of claim 5 wherein the two transistors of the flying capacitor circuit are integrated on a chip with the microcontroller.

8. The charge pump of claim 1 wherein the power source comprises exactly one galvanic cell.

9. The charge pump of claim 1 wherein the voltage across the power source is less than 1.6 volts.

10. The charge pump of claim 9 wherein VCCmin is at least 1.8 volts.

11. A method of operating a programmable microcontroller, which operates with an input voltage level of at least VCCmin, using a direct current power source, the power source having an output voltage of less than VCCmin, the method comprising the steps of:
    a. connecting a flying capacitor circuit having a flying capacitor to the programmable microcontroller and the power source;
    b. programming the programmable microcontroller with firmware to repeatedly switch the flying capacitor between being connected in series with the power source and being connected in parallel with the power source;
    c. connecting a supply capacitor to the power supply terminal of the microcontroller to supply a voltage to the programmable microcontroller;
    d. charging the supply capacitor using an external power source so that the voltage supplied to the programmable microcontroller is at least VCCmin and the programmable microcontroller begins to execute the firmware; and
    e. disconnecting the external power source from the charge pump after the initial charging has been completed,
    wherein the switching of the flying capacitor is controlled by the firmware so as to maintain the voltage supplied to the programmable microcontroller at a level of at least VCCmin.

12. The method of claim 11 wherein the switching of the flying capacitor is performed in a pre-determined pattern that is pre-determined to be sufficient to maintain the voltage provided to the microcontroller at a level of at least VCCmin.

13. The method of claim 12 wherein the pre-determined pattern is selected to maintain the voltage supplied to the microcontroller at a voltage in a pre-defined sub-range between a lower level that is greater than VCCmin and an upper level that is less than two times the voltage across the power source.

14. The method of claim 11 wherein the supply capacitor is initially charged by an external power source to supply a voltage of at least VCCmin to the microprocessor.

15. The method of claim 11 wherein the microcontroller monitors the voltage being provided to the microcontroller and switches the voltage through the flying capacitor as required to maintain the voltage being supplied to the microcontroller at a level of at least VCCmin.

16. The method of claim 11 wherein the flying capacitor circuit further comprises two transistors, one being a high-side switching transistor and the other being a low-side switching transistor.

17. The method of claim 11 wherein the voltage across the power source is less than 1.6 volts.

18. The method of claim 17 wherein VCCmin is at least 1.8 volts.

19. A microcontroller circuit comprising a programmable microcontroller and a charge pump as claimed in claim 1.

* * * * *